Feb. 20, 1962 J. W. KOVACH 3,021,868
NON-THERMAL MIXING VALVE
Filed Aug. 1, 1957 2 Sheets-Sheet 1
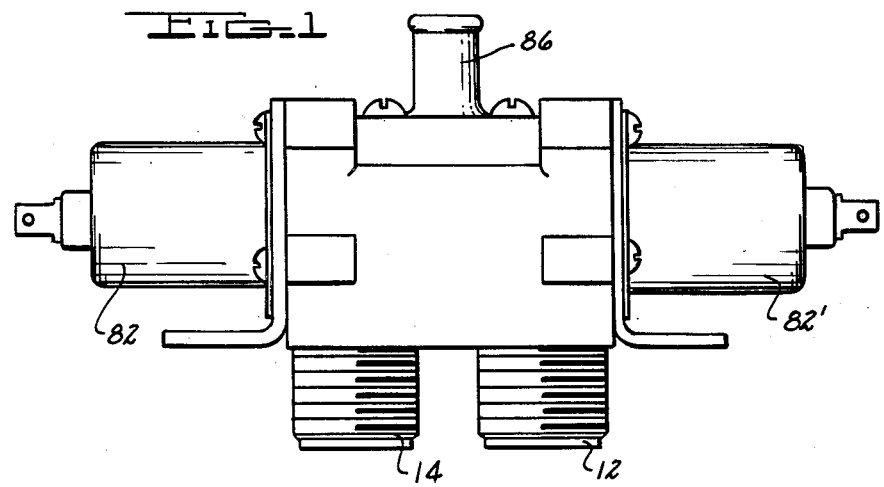
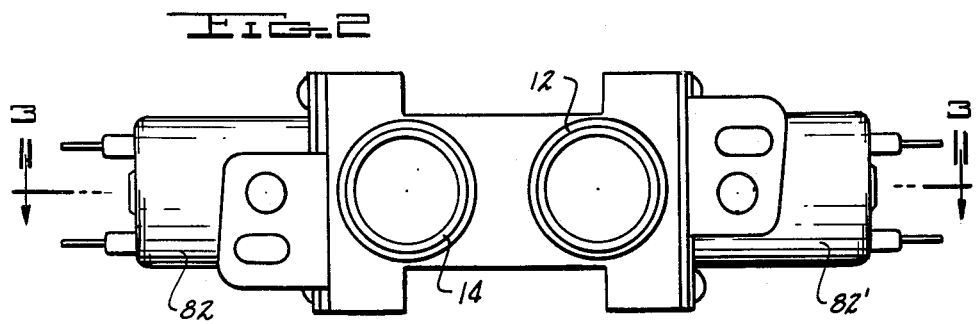
INVENTOR.
JULIUS WILLIAM KOVACH
BY
SMITH, OLSEN, LEWIS & McRAE
ATTORNEYS

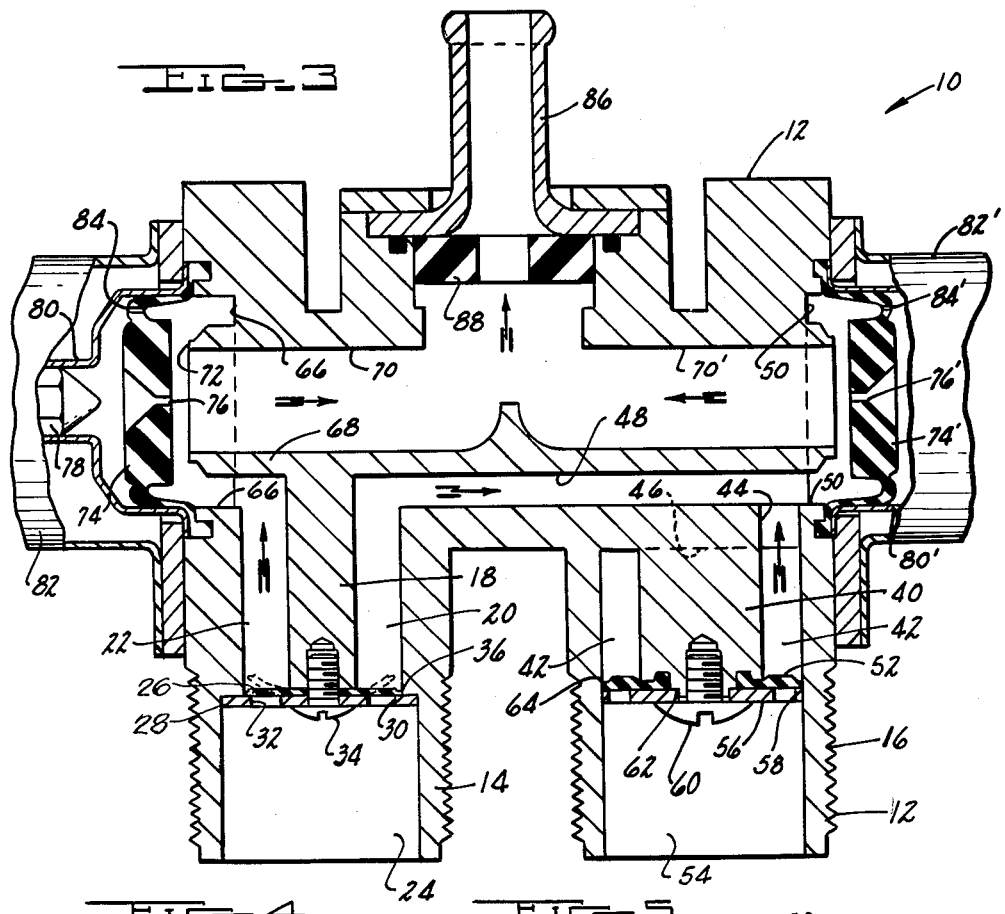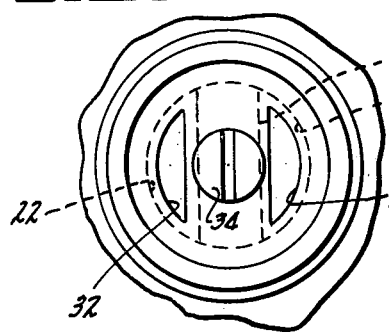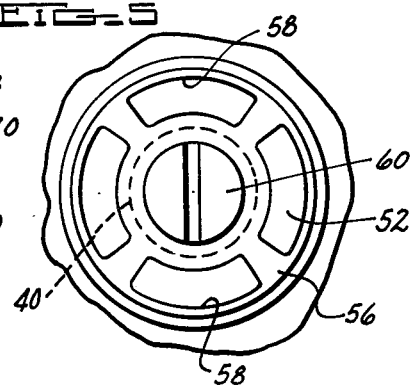
INVENTOR.
JULIUS WILLIAM KOVACH
BY
SMITH, OLSEN, LEWIS & McRAE
ATTORNEYS United States Patent Office 3,021,868
Patented Feb. 20, 1962

3,021,868
NON-THERMAL MIXING VALVE
Julius William Kovach, Detroit, Mich., assignor to American Radiator & Standard Sanitary Corporation, New York, N.Y., a corporation of Delaware
Filed Aug. 1, 1957, Ser. No. 675,716
5 Claims. (Cl. 137—607)

This invention relates to a valve useful for mixing hot and cold fluids together prior to their entry into the tub of an automatic clothes washing machine.

Objects of the invention are to provide a valve of the above character wherein:

(1) The valve is provided with solenoid-operated valve elements, whereby to enable discharge of three different temperature fluids by selective energization of the solenoids, (2) The valve is of relatively low cost construction (considering the functions which it is designed to perform), and (3) The valve is of a comparatively flat compact shape, whereby to adapt it for use within small clearance spaces in automatic clothes washing machines.

Other objects of this invention will appear in the following description and appended claims, reference being had to the accompanying drawings forming a part of this specification wherein like reference characters designate corresponding parts in the several views.

In the drawings:

FIGURE 1 is a plan view of one embodiment of the invention.

FIGURE 2 is an elevational view of the FIGURE 1 embodiment.

FIGURE 3 is a sectional view on line 3—3 in FIGURE 2.

FIGURE 4 is an elevational view showing the hot fluid inlet conduit in the FIGURE 1 embodiment.

FIGURE 5 is an elevational view showing the cold fluid inlet conduit in the FIGURE 1 embodiment.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a mixing valve 10, comprising a valve body 12 having a threaded hot fluid inlet conduit 14 and a threaded cold fluid inlet conduit 16.

A wall 18 extends axially and diametrically within conduit 14 so as to form two separate passages 20 and 22 for receiving hot fluid from the upstream section 24 of the conduit. An elastomeric resilient valve disk 26 extends across the conduit so as to prevent reverse flow out of passages 20 and 22. Disk 26 is positioned between the upstream edge of wall 18 and a circular metal disk 28, which is provided with flow-through openings 30 and 32. A screw 34 clamps disk 26 and plate 28 onto wall 18; the arrangement being such that the fluid pressure in conduit section 24 acts through openings 30 and 32 onto disk 26 so as to deflect the outer edges thereof in a downstream direction (as indicated by the dotted lines in FIGURE 3), whereby the hot fluid is enabled to flow into passages 20 and 22. Reverse fluid flow out of passages 20 and 22 is prevented by flash edge portion 36, which seats tightly against the downstream face of plate 28 in response to high fluid pressures in passages 20 and 22.

Cold fluid conduit 16 is partially defined by a cylindrical wall 40, which forms an annular passage 42. An opening 44 extends partially through wall portion 46 of the valve body to put passage 42 in communication with a passage 48, which extends laterally from hot fluid passage 20. The arrangement is such that hot fluid from passage 20 flows into the stream of cold fluid passing through opening 44 so as to produce a warm fluid stream in annular passage 50.

A resilient elastomeric check valve disk 52 is positioned on the upstream face of wall 40 so as to allow fluid flow from conduit section 54 into passage 42 while preventing reverse fluid flow from passage 42 into conduit section 54. Disk 52 is seated against a rigid metal plate 56, which is provided with flow-through openings 58. A screw 60 holds plate 56 against an annular shoulder 62 formed on wall 40. The arrangement of parts is such that the fluid pressure in conduit section 54 acts through openings 58 onto disk 52 so as to deflect the disk outer edge in a manner permitting fluid flow into passage 42. Reverse fluid flow from passage 42 into conduit section 54 is prevented by flash edge portion 64 of the disk, which seats tightly against plate 56 in response to high fluid pressures in passage 42. The resilient elastomeric character of disk 52 enables its outer edge portion to automatically return toward a seated position when the pressure in passage 42 becomes greater than that in section 54.

It will be noted that hot fluid passage 22 communicates with an annular passage 66 formed by annular wall 68. The inner surface of wall 68 defines a cylindrical passage 70 which extends inwardly from an annular valve surface 72. Fluid flow from passage 66 into passage 70 is controlled by an elastomeric diaphragm 74 which is provided with a central opening 76. An armature plunger 78 is slidably arranged in fixed guide sleeve 80 for axial movement toward and away from opening 76. Guide sleeve 80 is contained within a solenoid 82, the arrangement of parts being such that when the solenoid is energized plunger 78 is forced outwardly to its FIGURE 3 position spaced from opening 76.

In the FIGURE 3 position the pressure of fluid in passage 66 is sufficient to hold diaphragm 74 away from valve surface 72 so as to permit fluid flow into passage 70. When solenoid 82 is de-energized a spring in the outer end of sleeve 80 (not shown) biases plunger 78 to a position closing opening 76. As a result the fluid in passage 66 is enabled to flow through bleed opening 84 so as to develop a rightward pressure on the left face of the diaphragm. This fluid pressure closes the diaphragm against valve surface 72 so as to halt fluid flow from passage 66 into passage 70.

Warm fluid passage 50 encircles a passage 70', which is aligned with passage 70, the arrangement of parts being such that fluid from passage 50 into passage 70' is controlled by a diaphragm 74' operating in the same manner as diaphragm 74.

When diaphragms 74' and 74 are both open the warm fluid in passage 70' merges with the hot fluid in passage 70 so as to produce an intermediate temperature fluid stream at outlet spigot 86. A conventional flow washer 88 may be arranged adjacent the spigot to maintain constant quantity fluid flow through the spigot, irrespective of variations in pressure in the hot and cold fluid streams.

When only diaphragm 74' is open fluid flow through conduit 14 is halted, and the fluid issuing from spigot 86 is at the "warm" temperature of the mixture issuing from passages 42 and 48.

When only diaphragm 74 is open the fluid issuing from spigot 86 is at the "hottest" temperature determined by the temperature of fluid in passage 22.

The outlet fluid temperature is hottest when only diaphragm 74 is open and coldest when only diaphragm 74' is open.

It will be noted from FIGURE 2 that the valve is fairly flat and compact so as to adapt it for use in relatively small spaces. The "flat, compact" character of the valve is made possible by the fact that all of the passages are located in the same plane, with no enlarged interior passage areas which would increase the valve body thickness. Also the design of the valve has eliminated the need for bulky and costly thermostats sometimes incorporated in mixing valves of the present type. The simplicity of the passage structure obtained by wall 18 also contributes to valve body compactness and lowered costs.

I claim:

1. A mixing valve comprising a valve body having separate hot and cold inlets; an outlet chamber; a first passageway from the hot inlet to the outlet chamber; a first valve device in said first passageway for controlling flow therethrough; a second passageway from the cold inlet to the outlet chamber; a second valve device in said second passageway for controlling flow therethrough; a first check valve in said first passageway for preventing reverse flow therethrough; a second check valve in said second passageway upstream of the second valve device for preventing reverse flow therethrough; a third passageway extending from the hot inlet at a point upstream from the first passageway to a point in the second passageway between the second check valve and second valve device; a third check valve in said third passageway for preventing reverse flow therethrough; the sole reverse flow communication between the first passageway and hot inlet being through the first check valve; and the sole reverse flow communication between the third passageway and hot inlet being through the third check valve.

2. A mixing valve comprising a valve body having two inlet conduits, one for introducing cold fluid into the valve, and one for introducing hot fluid into the valve; a subdividing wall extending within the hot fluid conduit and forming two separate passages for receiving the hot fluid; check valve mechanism carried on said wall and serving to prevent fluid in either of said separate passages from flowing back into the hot inlet conduit; a third passage extending from one of the hot fluid passages into communication with the cold fluid inlet conduit so as to divert some of the hot fluid into the cold fluid stream in a manner to produce a warm fluid stream; an annular passage extending from the other hot fluid passage; a second annular passage extending from the cold fluid inlet conduit; two connected outlet passages extending axially within the annular passages to cooperate therewith in forming annular valve surfaces; diaphragms secured to the valve body and extending across said valve surfaces; and a solenoid overlying each of the diaphragms for selectively opening and closing respective ones of the two connected passages by causing the diaphragms to move away from and toward their adjacent valve surfaces.

3. A mixing valve comprising a valve body having separate hot and cold fluid inlet conduits; check valve means in said cold fluid inlet conduit preventing reverse flow therethrough; a subdividing wall extending within the hot fluid conduit and forming two separate passages for receiving the hot fluid; second check valve means at said subdividing wall serving to prevent fluid in either of said separate passages from flowing back into the hot fluid inlet conduit; a third passage extending from one of the hot fluid passages into communication with the cold fluid inlet conduit so as to divert at least some of the hot fluid stream into the cold fluid stream in a manner to produce a warm fluid stream; an annular passage extending from the other hot fluid passage; a second annular passage extending from the cold fluid inlet conduit; two connected outlet passages extending axially within the annular passages to cooperate therewith in forming annular valve surfaces; diaphragms secured to the valve body and extending across said valve surfaces; and a solenoid overlying each of the diaphragms for selectively opening and closing respective ones of the two connected passages by causing the diaphragms to move away from and toward their adjacent annular valve surfaces.

4. A mixing valve comprising a valve body having a first inlet conduit for introducing fluid of a first temperature to the valve, and a second inlet conduit parallel thereto for introducing fluid of a second temperature into the valve; check valve means in said second conduit preventing reverse flow therethrough; a subdividing wall extending within the first conduit and forming two separate passages for receiving fluid; second check valve means at said subdividing wall serving to prevent fluid in either of said separate passages from flowing back into the first conduit; a third passage extending laterally from one of said fluid passages into communication with the second inlet conduit so as to divert some of the first temperature fluid into the second temperature fluid stream in a manner to produce an intermediate temperature fluid stream; an annular passage extending from the other one of the separate fluid passages; a second annular passage extending from the second inlet conduit; two connected outlet passages extending axially within the annular passages to cooperate therewith in forming annular valve surfaces; diaphragms secured to the valve body and extending across said valve surfaces; a solenoid overlying each of the diaphragms for selectively opening and closing respective ones of the two connected passages by causing the diaphragms to move away from and toward their adjacent valve surfaces; a discharge passage receiving fluid from the two connected outlet passages; and a device in said discharge passage maintaining a substantially constant volumetric delivery therethrough whether fluid is being received from either or both of the outlet passages.

5. A mixing valve comprising a valve body having a first inlet conduit for introducing fluid of a first temperature into the valve and a second inlet conduit for introducing fluid of a second temperature into the valve; a subdividing wall extending within the first conduit forming two separate passages for receiving fluid; a flexible disk positioned against the upstream edge of said subdividing wall and spanning both of the separate passages; an apertured wall member positioned against the upstream face of said flexible disk to cooperate therewith in preventing reverse fluid flow from the separate passages into the first inlet conduit; a third passage extending from one of the aforementioned separate passages into communication with the second inlet conduit to divert at least some of the first temperature fluid into the second temperature fluid stream in a manner to produce an intermediate temperature fluid stream; shut-off means carried by the valve body for halting the intermediate temperature fluid stream; and second shut-off means carried by the valve body for halting the stream through the other of the aforementioned separate fluid passages.

References Cited in the file of this patent

UNITED STATES PATENTS

| | | |
|---|---|---|
| 2,553,769 | Kempton | May 22, 1951 |
| 2,610,837 | Puster | Sept. 16, 1952 |
| 2,644,476 | Smith | July 7, 1953 |
| 2,698,029 | Branson | Dec. 28, 1954 |
| 2,712,324 | Lund | July 5, 1955 |
| 2,719,536 | Stone | Oct. 4, 1955 |
| 2,837,282 | Budde | June 3, 1958 |